United States Patent
Allirot et al.

(10) Patent No.: US 12,271,770 B2
(45) Date of Patent: Apr. 8, 2025

(54) PAYMENT CARD READING SYSTEM HAVING A PROTECTIVE FLAP

(71) Applicant: BANKS AND ACQUIRERS INTERNATIONAL HOLDING, Paris (FR)

(72) Inventors: Richard Allirot, Corenc (FR); Pierre Morel, Charpey (FR)

(73) Assignee: BANKS AND ACQUIRERS INTERNATIONAL HOLDING, Paris (FR)

( * ) Notice: Subject to any disclaimer, the term of this patent is extended or adjusted under 35 U.S.C. 154(b) by 194 days.

(21) Appl. No.: 17/627,015

(22) PCT Filed: Jul. 3, 2020

(86) PCT No.: PCT/EP2020/068767
§ 371 (c)(1),
(2) Date: Jan. 13, 2022

(87) PCT Pub. No.: WO2021/008895
PCT Pub. Date: Jan. 21, 2021

(65) Prior Publication Data
US 2022/0277177 A1    Sep. 1, 2022

(30) Foreign Application Priority Data

Jul. 16, 2019 (FR) ..................................... 1908008

(51) Int. Cl.
*G06K 13/08* (2006.01)
*G06K 13/04* (2006.01)
(52) U.S. Cl.
CPC ......... *G06K 13/0875* (2013.01); *G06K 13/04* (2013.01)

(58) Field of Classification Search
CPC .... G06K 13/0875; G06K 13/04; G06K 13/08; G06K 13/0868
See application file for complete search history.

(56) References Cited

U.S. PATENT DOCUMENTS 5,892,210 A * 4/1999 Levasseur ............ G06K 7/0013
235/380
8,235,295 B2 * 8/2012 Trampert .................. G07C 7/00
235/486
(Continued)

FOREIGN PATENT DOCUMENTS

DE      102006006148 A1 * 11/2007 ............. G07F 17/16
EP      0924633 A2      6/1999
(Continued)

OTHER PUBLICATIONS

International Preliminary Report on Patentability and English translation of the Written Opinion of the International Searching Authority dated Jan. 18, 2022, for corresponding International Application No. PCT/EP2020/068767, filed Jul. 3, 2020.
(Continued)

*Primary Examiner* — Sonji N Johnson
(74) *Attorney, Agent, or Firm* — David D. Brush; Westman, Champlin & Koehler, P.A.

(57) ABSTRACT

A transaction card reading system, which includes: a transaction card reader having a slot for inserting a transaction card; and a protective flap movable between two positions: a closed position wherein the flap closes the insertion slot, and an open position wherein the flap is disposed at least partly outside the insertion slot. The protective flap includes a closure element integrally mounted on a one-piece support element, the closure element being shaped and dimensioned to close the insertion slot in the closed position. The one-piece support element includes at least one elastically
(Continued)

deformable portion so as to allow switching from the closed position to the open position and vice versa.

10 Claims, 3 Drawing Sheets

(56) References Cited

U.S. PATENT DOCUMENTS

| | | | | |
|---|---|---|---|---|
| 9,747,530 | B2* | 8/2017 | Goh | G06K 13/0875 |
| 2006/0086793 | A1* | 4/2006 | Oguchi | G06K 13/085 |
| | | | | 235/441 |
| 2006/0214002 | A1 | 9/2006 | Hug et al. | |
| 2017/0061259 | A1 | 3/2017 | Goh | |
| 2018/0276424 | A1* | 9/2018 | Miyazawa | G06K 13/06 |

FOREIGN PATENT DOCUMENTS

| | | |
|---|---|---|
| EP | 0924633 A3 | 11/2001 |
| FR | 2837958 A1 | 10/2003 |

OTHER PUBLICATIONS

International Search Report dated Sep. 11, 2020 for corresponding International Application No. PCT/EP2020/068767, Jul. 3, 2020.
Written Opinion of the International Searching Authority dated Sep. 11, 2020 for corresponding International Application No. PCT/EP2020/068767, filed Jul. 3, 2020.
French Search Report and Written Opinion with English machine translation dated Mar. 11, 2020 for corresponding French Application No. 1906684, filed Jun. 20, 2019.

* cited by examiner

PAYMENT CARD READING SYSTEM HAVING A PROTECTIVE FLAP

CROSS-REFERENCE TO RELATED APPLICATIONS

This Application is a Section 371 National Stage Application of International Application No. PCT/EP2020/068767, filed Jul. 3, 2020, which is incorporated by reference in its entirety and published as WO 2021/008895 A1 on Jan. 21, 2021, not in English.

TECHNICAL FIELD

The invention lies in the field of transaction card readers. The object of the invention is a transaction card reading system intended, for example, to be mounted in a transaction card reading terminal, such as a payment terminal or an automatic vending machine. More particularly, the invention relates to any type of card reading system comprising a slot for inserting a transaction card.

PRIOR ART

Various devices exist for reading an information carrier card, referred to herein by the term transaction card, which comprises one or more communication technologies.

For example, a transaction card may comprise a magnetic strip on its surface. The data carried by the transaction card are then written on the magnetic strip by alternating the orientation of magnetic particles integrated in the strip. This data is usually transmitted to a reading device by swiping the card through a magnetic strip reader of the device. A transaction card can also be in the shape of an integrated circuit card, which can be of the contact or contactless type. In this case, the transaction card comprises an integrated circuit capable of processing information. Such a transaction card can receive an input that is processed through the integrated circuit or the chip with an application based thereon, then provide an output. A contact integrated circuit card comprises a contact zone made up of several contact areas. When the contact integrated circuit card is inserted into a card reader, these contact areas contact electrical connectors on the reader, which allow to read the information from the chip and possibly write it back. A contactless integrated circuit card (also called a contactless interface card, or more simply a contactless card) contains a chip that communicates with a card reader via RFID induction technology. A contactless integrated circuit card only requires the proximity of an antenna to implement a transaction, and generally does not need to be introduced into a reader.

A single transaction card can embed several communication technologies. For example, the same transaction card may include a magnetic strip and a contact chip, or a contact chip and a contactless interface, or else a magnetic strip, a contact chip, and a contactless interface. A transaction card including a magnetic strip and at least one (contact and/or contactless) chip is sometimes referred to as a hybrid transaction card.

To accommodate differences that may exist between transaction card technologies, vendors provide different transaction card readers. Typically, a transaction card reading system comprises at least one transaction card reader comprising a slot for inserting a transaction card, so as to make the system compatible with transaction cards of the contact integrated circuit card type, which are very widespread. To meet specific constraints, manufacturers can also provide hybrid readers. A hybrid reader is, like a hybrid transaction card, a reader that supports two or more different communication technologies. This is for example a reader comprising means for reading a chip of a contact integrated circuit card and means for reading a magnetic strip of a magnetic strip card. For reasons of compactness and ease of use, a hybrid reader generally includes only one insertion slot, which can be used equally for the insertion of a contact integrated circuit card or of a magnetic strip card: such a reader is indeed designed to recognise a contact integrated circuit card from a magnetic strip card and to be able to switch to either one of these technologies depending on the transaction card inserted into the insertion slot. Hybrid readers can, for example, be integrated into automatic vending machines (of the type of petrol station pump, various vending machines) or else into automatic teller machines (ATM). Many of these automatic devices are accessible through self-service, unattended, and/or installed in unprotected environments. For example, it is common for an automatic teller machine for tram or train tickets to be available on a station platform, outside, in order to allow a user to purchase a ticket even at late hours or in stations with little traffic and no dedicated sales staff. The insertion slot of a transaction card (typically, the insertion slot into which a user introduces their payment card to purchase a good or a service) then generally constitutes a point of weakness of such an automatic machine, because it forms an opening through which internal and potentially sensitive components of the reader (for example an integrated circuit card connector) are accessible. To protect these components from intentional damage (such as acts of opportunistic vandalism, where an individual attempts to introduce any object they have in hand, other than a transaction card, into the insertion slot, for example a teaspoon or a metro ticket) or unintentional degradation or damage (due for example to the careless error of an individual who makes a mistake and inserts coins or the wrong ticket into the wrong slot, or due for example to water splashes during bad weather), some transaction card reading systems comprise a protective flap which closes the insertion slot of the transaction card reader when it is not used. Various mechanisms exist so that the protective flap releases access to the insertion slot, when the beginning of insertion of a transaction card of the expected format into the insertion slot is detected. These mechanisms can be at least partially automated (relying in particular on the use of electronic sensors to detect the presence of a transaction card and/or on a motorised opening of the protective flap) or else be purely mechanical (manual pushing exerted on the transaction card to introduce it into the insertion slot of the reader actuates mechanical means for unlocking the protective flap which allow to completely free access to the insertion slot).

Existing transaction card reading systems incorporating a protective flap, however, have disadvantages. Indeed, the integration of a protective flap within a transaction card reader involves many elements which often complicate the manufacture and assembly of both the reader and the protective flap. For example, in the case of purely mechanical mechanisms, it is often necessary to provide, within the casing of the reader, means allowing the rotation of the protective flap around an axis, as well as various return springs external to the flap to return this flap in the closed position when there is no longer a transaction card inserted into the reader. It is also a question of providing means allowing these springs to be held in position, both in the case of the reader and on the protective flap. In the case of partially or fully automated mechanisms, production and assembly prove to be even more complex, in addition to being more expensive, since the integration of the protective flap implies the presence of additional elements, such as sensors or a motor, for which the power supply must also be provided. Furthermore, these automated protective flaps may prove to be more frequently prone to failure. Finally, whether they are automated or not, the presence of the many elements necessary for the integration of a protective flap within a reader is currently a limiting factor when it comes to designing a transaction card reading system as compact as possible.

There is therefore a need for a transaction card reading system with a protective flap which does not have at least some of these disadvantages of the prior art.

SUMMARY OF THE INVENTION

The present technique allows to partially solve the problems posed by the prior art. The present technique indeed relates to a transaction card reading system comprising:
- a transaction card reader comprising a slot for inserting a transaction card; and
- a protective flap movable between two positions: a closed position wherein the flap closes said insertion slot, and an open position wherein the flap is disposed at least partly outside said insertion slot.

According to the proposed technique, the protective flap comprises a closure element integrally mounted on a one-piece support element, said closure element being shaped and dimensioned to close said insertion slot in said closed position, said support element comprising at least one elastically deformable portion so as to allow switching from the closed position to the open position and vice versa.

In this way, the transaction card reading system is simpler in design than the systems of the prior art. In particular, fewer elements are required to integrate a protection flap within a reader. The elastically deformable portion of the support element allows the flap to switch from the closed position to the open position and vice versa, without the need to use springs external to the protective flap. Such a design thus allows the implementation of transaction card reading systems that are more compact and easier to assemble than the systems of the prior art.

In a particular embodiment, the closure element is in the shape of an at least partially metallic blade with a thickness greater than 0.35 mm and the one-piece support element is formed from an at least partially metallic plate with a thickness less than 0.30 mm.

In this way, the one-piece support element and the protective flap can be produced simply, on a large scale and inexpensively by implementing known techniques of cutting, bending and embossing of metal plates.

In a particular embodiment, the support element comprises at least one lifting pad on which a transaction card exerts a pressing force, when said transaction card is introduced into said insertion slot, causing the deformation of said at least one elastically deformable portion.

In a particular embodiment, said support element comprises two lifting pads spaced apart by a distance substantially equal to the width of said insertion slot.

In this way, the two lifting pads are spaced apart by a distance substantially equal to (or slightly less than) the width of a standard size transaction card intended to be used in conjunction with the transaction reading system, which allows to implement a function for detecting a standard size card.

According to one particular feature of this embodiment, said closure element comprises two stops, each stop being respectively disposed opposite a pad of said two lifting pads.

In this way, the movement of the lifting pads is limited by these stops when the edge of a transaction card inserted into the reader exerts a pressing force on the lifting pads.

In a particular embodiment, at least one of the closure element and the support element comprises protective means capable of limiting the friction of said protective flap on a chip disposed on a transaction card, when inserting said transaction card into said insertion slot or when withdrawing said transaction card from said insertion slot.

In this way, the protection means reduce the risk of the chip of a transaction card being torn off by rubbing or catching on the protective flap, in particular when a transaction card that is worn or has a defect of detachment of the chip is used in conjunction with the transaction card reading system.

According to one particular feature of this embodiment, said protection means are in the shape of a chamfered zone and/or a recessed zone within said at least one of the closure element and the one-piece support element.

In this way, the means for protecting the chip are particularly simple to implement.

In a particular embodiment, the one-piece support element comprises at least one solder tab soldered to said transaction card reader.

In this way, the protective flap can be assembled in a simple way to the transaction card reader, by simple soldering.

According to one particular feature of this embodiment, said at least one solder tab is soldered to a ground plane of said transaction card reader.

In this way, the one-piece support element forms a metal track capable of discharging the electrostatic energy potentially stored in a transaction card during its introduction into the insertion slot of the reader, before this card contacts sensitive electronic components of the card reader. These sensitive electronic components are thus protected.

In a particular embodiment, the closure element is soldered to the one-piece support element.

In this way, the integral mounting of the closure element on the one-piece support element is particularly easy to implement.

The various embodiments mentioned above can be combined with each other for the implementation of the invention.

FIGURES

Other features and advantages of the invention will emerge more clearly upon reading the following description of a preferred embodiment, given by way of simple illustrative and non-limiting example, and the appended drawings, among which:

DETAILED DESCRIPTION OF THE INVENTION

Figure 1:
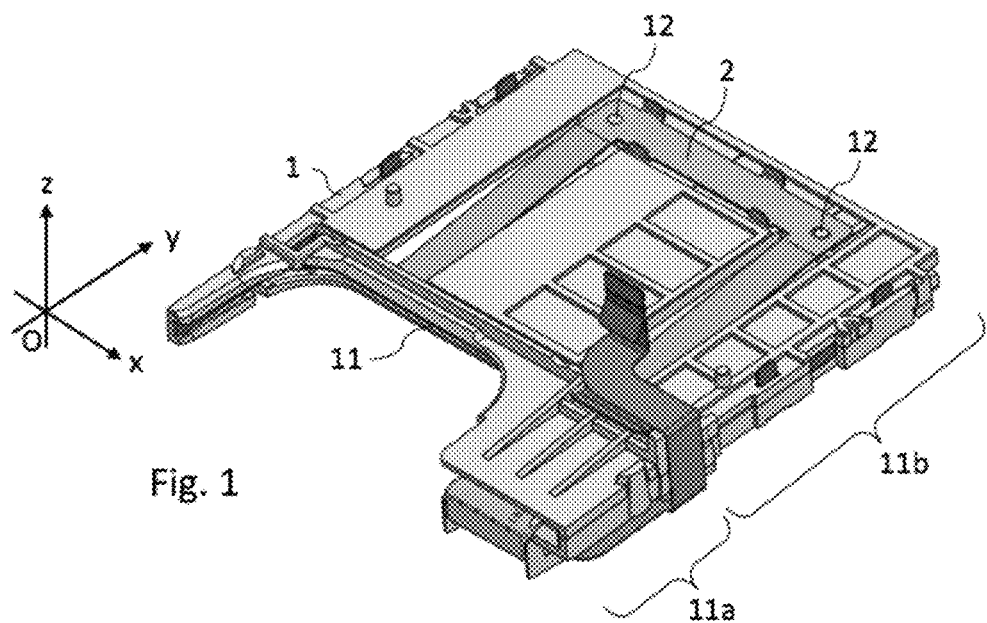
FIG. 1 shows a partial perspective view of a transaction card reading system comprising a transaction card reader and a protective flap, in a particular embodiment of the proposed technique.

In the following, the descriptions of the figures are made relative to an orthonormal reference frame of type (O, x, y z). The elements qualified as "upper" elements have, relative to this reference frame an altitude (z) higher than the elements qualified as "lower" elements. The notions of left and right, and before and behind are also to be understood as referring to this reference (O, x, y z). Thus the left portion of the transaction card reader is the one whose abscissa is closest to O while the right portion of the transaction card reader is the one whose abscissa is furthest from O. The front portion of the transaction card reader is the one whose ordinate is closest to O while the rear portion of the transaction card reader is the one whose ordinate is furthest from O. Similarly, the notion of verticality should be understood as referring to the direction of the axis z. The same reference frame is used for the description of the other components of a transaction card reading system according to the proposed technique, and in particular for the description of the protection flap and the elements that compose it.

Throughout the description, elements of the same nature are identified by the same reference numeral in the figures.

The present invention relates to a transaction card reading system as illustrated in relation to FIG. 1, in one embodiment of the proposed technique. Such a transaction card reading system comprises:
  a transaction card reader 1 comprising a slot 11 for inserting a transaction card; and
  a protective flap 2 movable between two positions: a closed position wherein the protective flap 2 closes said insertion slot 11, and an open position wherein the protective flap 2 is disposed at least partly outside said insertion slot 11.

Figure 4:
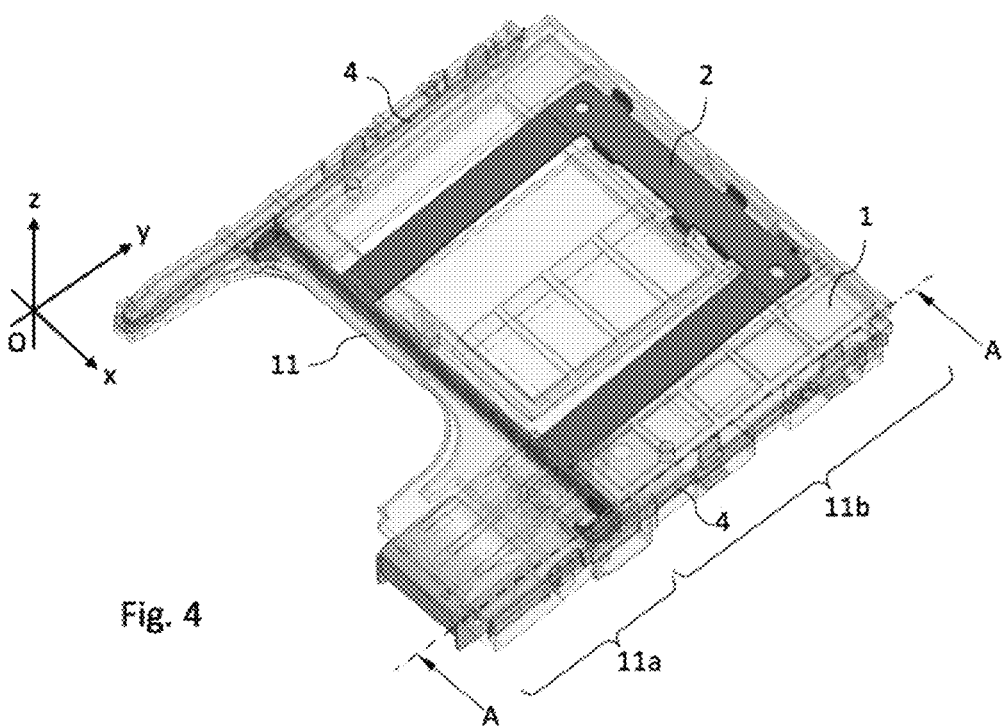
FIG. 4 shows a partial perspective view of the transaction card reading system of FIG. 1, wherein some parts of the upper portion of the reader are not shown or are shown in transparency in order to facilitate viewing of the protective flap, in a particular embodiment of the proposed technique.

"Closed position" and "closing the insertion slot" here mean that the protective flap closes access to at least a rear portion 11b of the insertion slot 11. However, as can be seen in FIGS. 1 and 4, a front portion 11a of the insertion slot 11 can remain permanently accessible, including when the protective flap 2 is in the closed position, in order in particular to allow to initiate the guiding of a transaction card when it begins to be engaged in the reader. Conversely, in the "open position" the protective flap is disposed at least partly outside said insertion slot 11, in a receiving housing provided for this purpose in the upper portion of the reader 1, so that this protective flap does not hinder the complete insertion of a transaction card into the reader (that is to say it does not hinder its insertion, including in the portion 11b of the insertion slot 11).

The protective flap 2 is designed to be compact, uncomplicated, easy to assemble, simple and inexpensive to produce. An example of such a protective flap is presented alone (that is to say not mounted in a transaction card reader) in relation to FIGS. 2 and 3. According to the general principle of the proposed technique, the protective flap 2 is formed of two distinct elements: a closure element 22 and a one-piece support element 21. The closure element 22 is integrally mounted on the one-piece support element 21. The closure element 22 is shaped and dimensioned to close the insertion slot of a transaction card reader wherein the protective flap 2 is mounted, when this protective flap 2 is in the closed position. For example, the closure element 22 is of substantially rectangular shape, with a length substantially equal to or slightly less than the width of the insertion slot (dimension along the axis x), and a width substantially equal to or slightly less than the height of the insertion slot (dimension along the axis z). The protective flap 2 extends in the direction of the axis x, perpendicular to the direction of the axis y which corresponds to the direction of introduction of a transaction card into the insertion slot 11. The support element 21 is made in one piece in that it is formed integrally (and not by assembling several parts). This support element 21 comprises at least one elastically deformable portion 211, the function of which is to allow switching the protective flap 2 from the closed position to the open position and vice versa, when the protective flap is mounted in the transaction card reader. More particularly, the support element 21 is made of a material which makes the elastically deformable portion 211 able to deform under the exertion of an external pressure force, then to recover its initial shape corresponding to a state of rest when said external pressure force no longer applies, under the effect of an elastic return force intrinsic to the material used. As shown schematically in FIGS. 2 and 3, three zones (21a, 21b and 21c) each performing different functions can be distinguished on the one-piece support element 21. The front zone 21a of the support element 21 defines a zone for supporting the closure element 22: it is in this zone that the closure element 22 is fixed to the support element 21. The rear zone 21c defines a zone for fixing the support element 21 to the transaction card reader 1. Finally, the zone 21b is an intermediate zone located between the front support zone 21a and the rear fixing zone 21c: this zone 21b corresponds to the elastically deformable portion 211 of the support element 21. These different zones (21a, 21b and 21c) are described in more detail below, in one embodiment of the proposed technique.

The support zone 21a comprises a portion 215 for accommodating the closure element 22, extending in a vertical plane with a direction defined by the axes (x; z). It is on a front face of this accommodating portion 215 that the closure element 22 is integrally mounted on the one-piece support element 21, for example by soldering at different solder points or by gluing. According to one particular feature, the accommodating portion 215 has dimensions substantially equivalent to those of the closure element 22, which allows to maximise the fixing surface of these two elements and/or to reinforce the rigidity of the assembly formed by these two elements. In one embodiment, the support zone 21a also comprises at least one lifting pad 216, of which a portion 216a inclined relative to the vertical projects in front of the accommodating portion 215, and therefore in front of the closure element 22 fixed to the accommodating portion 215. Such a lifting pad 216 is shaped and dimensioned so that the inclined portion 216a is positioned in the insertion slot 11, in front of the closure element 22, when the protective flap 2 is mounted in the reader and is in the closed position. According to one particular feature, and as illustrated in the example of a protective flap shown in the figures, the one-piece support element 21 comprises two lifting pads 216 spaced apart by a distance substantially equal to the width of the insertion slot 11. The role of these lifting pads as well as other features of the protective flap 2 and of the transaction card reader are detailed later in this document, in relation to FIGS. 5 and 6 which describe the insertion kinematics of a transaction card into a transaction card reading system according to the proposed technique.

As described above, the intermediate zone 21b corresponds to the zone comprising at least one elastically deformable portion 211 of the support element 21. The protective flap 2 illustrated in the figures comprises two similar elastically deformable portions 211, which are in the shape of two blades each connecting the rear face of the accommodating portion 215 of the support zone 21a to the fixing zone 21c.

The fixing zone 21c comprises means for fixing the protective flap 2 to the transaction card reader 1. In one embodiment, these fixing means are in the shape of one or more solder tabs 212 intended to be soldered to corresponding zones of the reader, at a rear zone of the reader. According to one particular feature, these solder tabs 212 are in particular soldered to an electronic card (not shown in the figures) of the reader. The fixing zone 21c may also comprise, in one embodiment, one or more centring holes 213 intended to accommodate the corresponding centring pins 12 of the reader (visible in FIG. 1), so as to ensure precise and correct mounting of the protective flap 2 inside the reader. Optionally, in one embodiment, clipping tabs 214 are also provided at the fixing zone 21c: these clipping tabs 214 can be clipped into corresponding housings of the reader so as to allow pre-assembling the protective flap 2 in the reader before soldering the solder tabs 212.

In one embodiment, the one-piece support element 21 and the closure element 22 are formed from metal or at least partially metal plates. According to one particular feature, the closure element 22 is for example in the shape of a metal strip with a thickness greater than 0.35 millimetres. Such a thickness indeed allows to give the closure element 22 sufficient rigidity to resist the insertion of an unwanted object into the insertion slot of the reader, when the protective flap is in the closed position. In other words, the thickness of the closure element 22 is such that it is not easy to be deformed. For example, the closure element 22 is formed from a sheet metal plate which is 0.40 millimetres thick. According to one particular feature, the one-piece support element is in turn formed from a metal plate with a thickness less than 0.30 millimetres. This smaller thickness (compared to that of the closure element) allows to give sufficient flexibility to the one-piece support element to form the elastically deformable portion 211. For example, the one-piece support element 21 is formed from a sheet metal plate which is 0.25 millimetres thick. Thus, the closure element 22 and the support element 21 both have the advantage of being able to be produced simply, on a large scale and at a lower cost thanks to the implementation of known techniques of cutting, bending and embossing of metal plates. The lifting pads 216, the solder tabs 212 and the clipping tabs 214 of the support element 21 can for example be obtained easily by simply bending a previously cut metal plate. Furthermore, the protective flap thus obtained is more compact than the protective flaps of the prior art (in particular in terms of volume mobilised along the axes x and z, for switching the protective flap from the closed position to the open position and vice versa), which allows to implement transaction card reading systems that are also more compact.

Figure 2:
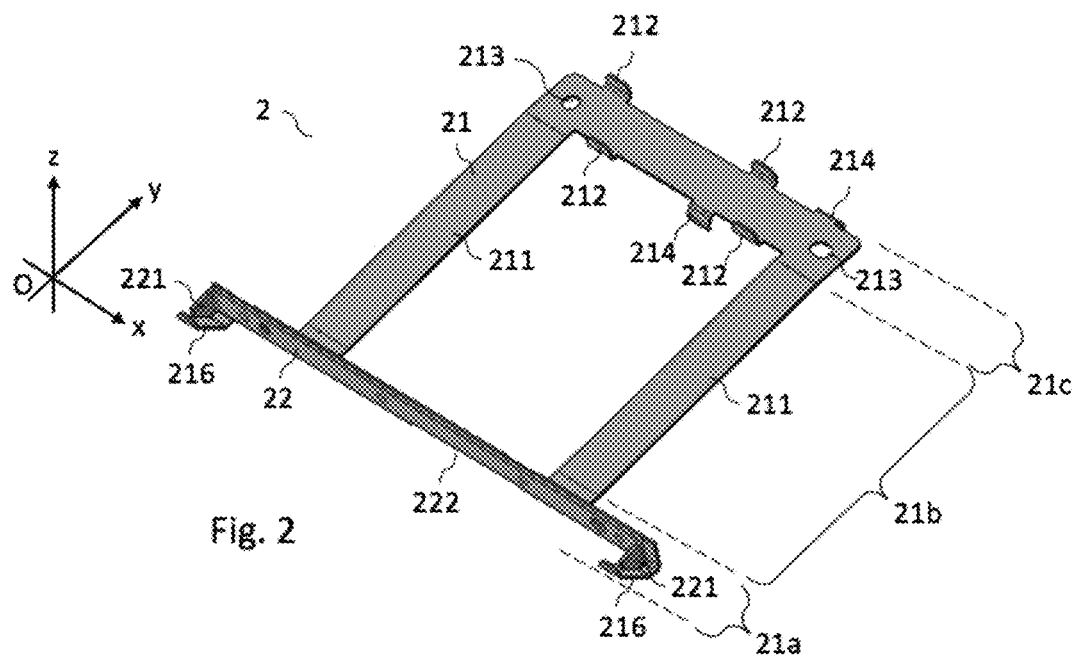
FIG. 2 shows a perspective view of a protective flap, in a particular embodiment of the proposed technique.
Figure 3:
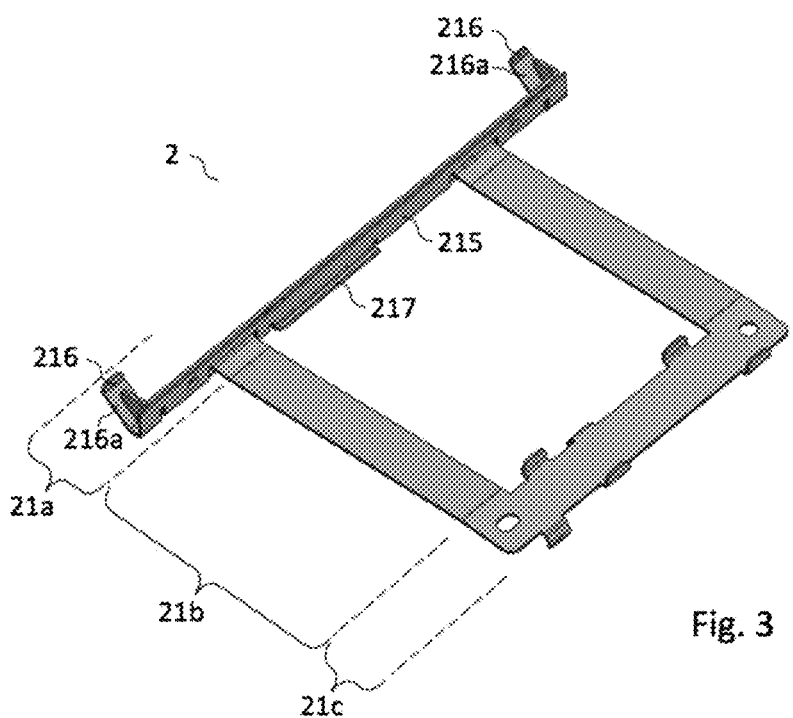
FIG. 3 shows another perspective view of the protective flap of FIG. 2, in a particular embodiment of the proposed technique.

FIG. 4 shows the protective flap 2 already described in relation to FIGS. 2 and 3 positioned within a transaction card reader 1 to form a transaction card reading system, in an embodiment of the proposed technique. In this figure, some elements of the upper portion of the reader are shown in transparency or are not shown, so that the protective flap 2, shown in the closed position, is better visible.

Figure 5:
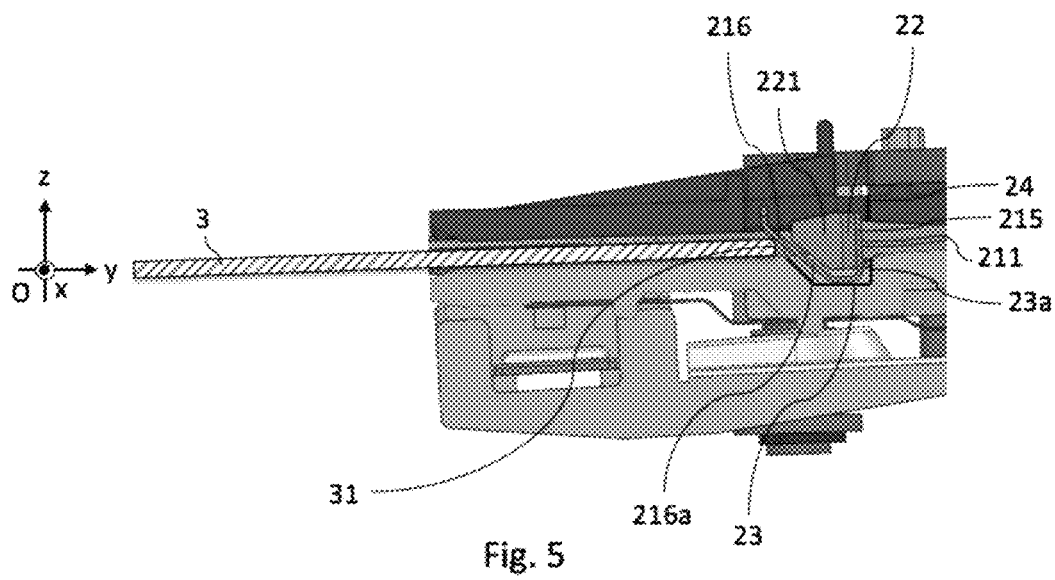
FIG. 5 is a cutaway sectional view of a transaction card reading system, along the section plane indicated by the axis A-A presented in relation to FIG. 4, in a first stage of introduction of a transaction card, in a particular embodiment of the proposed technique.
Figure 6:
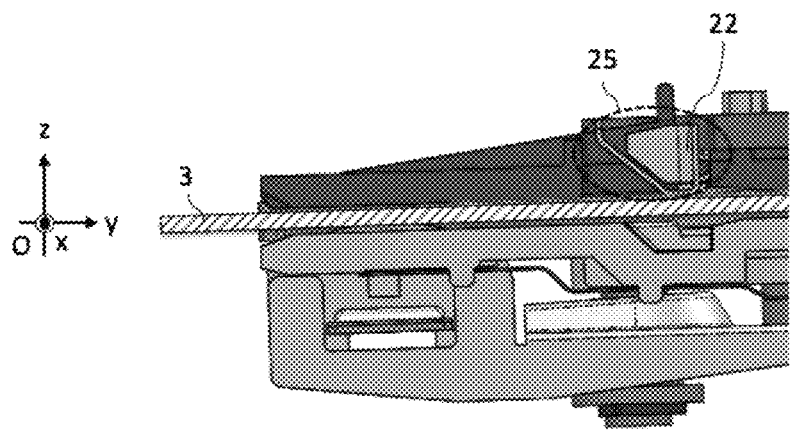
FIG. 6 shows the cutaway sectional view of a transaction card reading system already shown in FIG. 5, in a second stage of introduction of a transaction card, in a particular embodiment of the proposed technique.

FIGS. 5 and 6 show the same cutaway sectional view of a transaction card reading system, in a particular embodiment of the proposed technique. This sectional view is taken along the section plane indicated by the axis A-A presented in relation to FIG. 4. More particularly, FIGS. 5 and 6 show two different stages of insertion of a transaction card 3 into the transaction card reading system. In the configurations of FIGS. 5 and 6, the transaction card 3 is a standard size card, adapted for being used in the reading system shown.

In the configuration illustrated in relation to FIG. 5, the protective flap is in the closed position, and the transaction card 3 was engaged in the front portion of the insertion slot of the reader, and pushed until its front edge 31 contacts a front face of the inclined portion 216a of the lifting pads 216. This contact is made because the transaction card 3 is of standard size, that is to say that its width is only very slightly less than that of the insertion slot. At this point, if the user who engaged the transaction card 3 into the reader continues to exert pressure aimed at pushing the card into the insertion slot, the pressure force exerted by the card 3 on the inclined portion 216a of the lifting pads 216 will cause the progressive lifting of these pads, and incidentally of the accommodating portion 215 and of the closure element 22 towards a receiving housing 25 provided for this purpose in the upper portion of the reader, above the insertion slot. This lifting is made possible by the progressive deformation of the elastically deformable portion 211, under the effect of the pressure force exerted by the card on the lifting pads 216 and the inclined shape of portion 216a of the pads. According to one particular feature, the closure element 22 comprises stops 221 disposed opposite the lifting pads 216, at the rear of these pads, in order to limit the movement of the lifting pads 216 during the exertion of said pressure force. For example, as illustrated in FIGS. 2 and 3, the closure element comprises two stops 221, each stop being respectively disposed opposite one of the two lifting pads 216. These stops can for example be obtained easily by simple bending of the ends of the closure element 22, in particular when the latter is formed from a previously cut metal plate.

At some point, if the pressing force to push the card into the reader is maintained, the assembly formed by the accommodating portion 215 and the closure element 22 is sufficiently retracted into its receiving housing 25 to free access to the rest of the insertion slot (that is to say to the rear portion of the insertion slot). The protective flap is then held in the open position by the reaction force exerted by the upper face of the transaction card, which opposes the elastic return force of the elastically deformable portion. The transaction card 3 can then be pushed further into the reader, by sliding under the support zone of the one-piece support element, until it is finally fully inserted into the reader. Such a configuration is illustrated in relation to FIG. 6. According to one particular feature, at least one of the closure element 22 and the support element comprises protective means capable of limiting the friction that the protective flap could exert on a chip disposed on the upper face of the transaction card 3, during the insertion or withdrawal of this card in the insertion slot. These protection means are for example in the shape of a chamfered zone 217 (visible in FIG. 3) and/or a recessed zone 222 (visible in FIG. 2) within the closure element 22 and/or the accommodating portion 215. These protection means are intended to prevent the chip from being torn off from a transaction card by rubbing or catching on the protective flap, in particular when a transaction card that is worn or has a defect of detachment of the chip is used in conjunction with the transaction card reading system.

When the transaction card 3 is withdrawn from the transaction card reader, the protective flap swings again into its closed position, under the effect of the elastic return force of the elastically deformable portion (the transaction card 3 no longer present to exert a reaction force opposing this elastic return force).

According to one particular feature, when the one-piece support element is metallic (or at least partially metallic), the solder tabs (elements 212 of FIGS. 2 and 3) allowing to fix the protective flap to the transaction card reader are advantageously soldered to a ground plane of the transaction card reader. Thus, the contact of a transaction card with the lifting pads during the introduction of the card into the insertion slot allows—through the metal track formed from these lifting pads to the solder tabs via the elastically deformable portion—to discharge the electrostatic energy potentially stored in the transaction card before this card contacts sensitive electronic components of the card reader (typically the integrated circuit card connector of the reader). Metal rails disposed on either side of the insertion slot—in order to limit wear due to repeated friction of the left and right edges of the transaction cards on the reader—can also provide, alternatively or in addition, a similar function of electrostatic discharge of a transaction card, by being connected to the ground plane of the transaction card reader, for example by means of solder tabs which are specific thereto (such metal rails 4 are in particular visible in FIG. 4).

Attention is now paid to the case where it is no longer a transaction card of standard size, adapted for being used in the reading system, which is introduced into the reader, but any object of other dimension, liable to damage the reader, for example a coin. When attempting to introduce such an object into the reader, generally through the middle of the insertion slot, this object does not contact the lifting pads 216 because the latter are advantageously disposed on each side of the insertion slot, as shown in FIG. 4. Indeed, according to a particular feature already presented in relation to the description of the support zone, the one-piece support element comprises two lifting pads 216 spaced apart by a distance substantially equal to (or slightly less than) the width of the insertion slot 11, and therefore substantially equal to (or slightly less than) the width of a standard size transaction card intended to be used in conjunction with the transaction reading system. This spacing of the two pads therefore allows to implement, to a certain extent, a function of detecting a card of standard size: such a card engaged in the insertion slot necessarily contacts the two lifting pads 216, which is generally not the case when introducing any object. The two pads are advantageously of the same width, and they are shaped (that is to say sufficiently narrow) and disposed so as to contact non-embossed zones of a standard transaction card introduced into the reader, which allows to ensure that the two pads are lifted at the same time and from a substantially equal height. On the other hand, during an attempt to introduce any object into the reader, the protective flap remains in the closed position in the absence of pressure force exerted on the lifting pads 216. The object in question therefore collides with the closure element 22 which opposes its introduction into the insertion slot 11. The closure element 22 has sufficient rigidity allowing it not to deform, even in the event of significant pressure exerted by the object on this closure element. Advantageously, in one embodiment, the reader comprises in its lower portion, under the insertion slot, a groove 23 extending in the direction of the axis x, wherein the assembly formed by the accommodating portion 215 and the closure element 22 rests when the protective flap is in the closed position (optionally, a pre-stressing of the protective flap is implemented, so as to ensure that the assembly formed by the accommodating portion 215 and the closure element rests well at the bottom of the groove 23, when the protective flap is in the closed position). The height of the assembly formed by the accommodating portion 215 and the closure element 22 is greater than the depth of the groove (dimensions along the axis z), so that the closure element 22 projects above this groove when the protective flap is in the closed position, which allows to keep the insertion slot closed. This groove 23 comprises a vertical side wall 23a which forms a stop allowing to limit the movement of the closure element 22, and which opposes the pressure exerted by an object which one tries to introduce into the insertion slot. According to one particular feature, the receiving housing 25 also comprises at least one vertical wall 24 directly above the side wall 23a of the groove 23. The height of the assembly formed by the accommodating portion 215 and the closure element 22 is further dimensioned so that the upper portion of this assembly is engaged at least partially in the receiving housing 25, even when the protective flap is in the closed position. Thus, the side wall 23a of the groove and the at least one vertical wall 24 of the receiving housing 25 cooperate to respectively form a lower stop and an upper stop limiting the movement of the closure element 22 in the event of pressure being exerted by an object that one tries to introduce into the insertion slot (in the direction of the axis y). Thus, the closure element 22 abutting on the walls 23a (in its lower portion) and 24 (in its upper portion) is able to effectively oppose the introduction of an undesirable object into the insertion slot of the reader, even in the event of a significant force exerted by the object that a user would attempt to insert by force, and which could, in the absence of the stops 23 and 24, be such as to twist the elastically deformable portion 211.

The invention claimed is:

1. A transaction card reading system comprising:
   a transaction card reader comprising a slot for inserting a transaction card; and
   a protective flap movable between a closed position wherein the flap closes said insertion slot, and an open position wherein the flap is disposed at least partly outside said insertion slot;
   wherein the protective flap comprises a closure element integrally mounted on a one-piece support element, said closure element being shaped and dimensioned to close said insertion slot in said closed position, said one-piece support element comprising at least one elastically deformable portion so as to allow switching from the closed position to the open position and vice versa, said closure element and said one-piece support element being made of metal,
   said one-piece support element comprising first and second lifting pads on which a transaction card exerts a pressing force, when said transaction card is introduced into said insertion slot, causing the deformation of said at least one elastically deformable portion, the first and second lifting pads being spaced apart by a distance equal to or slightly less than a width of said insertion slot so as to implement a function of detecting a transaction card of a standard size.

2. The transaction card reading system according to claim 1 wherein the closure element is in the shape of an at least partially metallic blade with a thickness greater than 0.35 mm and wherein the one-piece support element is formed from an at least partially metallic plate with a thickness less than 0.30 mm.

3. The transaction card reading system according to claim 1, wherein said closure element comprises first and second stops, each stop being respectively disposed opposite a pad of said first and second lifting pads.

4. The transaction card reading system according to claim 1, wherein at least one of the closure element and the one-piece support element comprises a protective element which limits friction of said protective flap on a chip disposed on a transaction card, when inserting said transaction card into said insertion slot or when withdrawing said transaction card from said insertion slot.

5. The transaction card reading system according to claim 4, wherein said protection element is in the shape of a chamfered zone and/or a recessed zone within said at least one of the closure element and the one-piece support element.

6. The transaction card reading system according to claim 1, wherein the one-piece support element comprises at least one solder tab soldered to said transaction card reader.

7. The transaction card reading system according to claim 6, wherein said at least one solder tab is soldered to a ground plane of said transaction card reader.

8. The transaction card reading system according to claim 1, wherein the closure element is soldered to the one-piece support element.

9. A transaction card reading system comprising:
a transaction card reader comprising a slot for inserting a transaction card; and
a protective flap movable between a closed position wherein the flap closes said insertion slot, and an open position wherein the flap is disposed at least partly outside said insertion slot;
wherein the protective flap comprises a closure element integrally mounted on a one-piece support element, said closure element being shaped and dimensioned to close said insertion slot in said closed position, said one-piece support element comprising at least one elastically deformable portion so as to allow switching from the closed position to the open position and vice versa, said closure element and said one-piece support element being made of metal,
wherein at least one of the closure element or the one-piece support element comprises a protective element which limits friction of said protective flap on a chip disposed on a transaction card, when inserting said transaction card into said insertion slot or when withdrawing said transaction card from said insertion slot, wherein said protection element is in the shape of a chamfered zone and/or a recessed zone within said at least one of the closure element or the one-piece support element.

10. A transaction card reading system comprising:
a transaction card reader comprising a slot for inserting a transaction card; and
a protective flap movable between a closed position wherein the flap closes said insertion slot, and an open position wherein the flap is disposed at least partly outside said insertion slot;
wherein the protective flap comprises a closure element integrally mounted on a one-piece support element, said closure element being shaped and dimensioned to close said insertion slot in said closed position, said one-piece support element comprising at least one elastically deformable portion so as to allow switching from the closed position to the open position and vice versa, said closure element and said one-piece support element being made of metal,
wherein the one-piece support element comprises at least one solder tab soldered to said transaction card reader, said at least one solder tab being soldered to a ground plane of said transaction card reader.

* * * * *